United States Patent
Tseng

(10) Patent No.: US 11,251,999 B2
(45) Date of Patent: Feb. 15, 2022

(54) SYMBOL BOUNDARY DETECTION METHOD AND PROCESSOR

(71) Applicant: Realtek Semiconductor Corporation, Hsinchu (TW)

(72) Inventor: Chi-Hsiang Tseng, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/073,885

(22) Filed: Oct. 19, 2020

(65) Prior Publication Data

US 2021/0344532 A1 Nov. 4, 2021

(30) Foreign Application Priority Data

Apr. 29, 2020 (TW) ................................. 109114418

(51) Int. Cl.
| | |
|---|---|
| *H04L 27/148* | (2006.01) |
| *H04L 25/03* | (2006.01) |
| *H04L 27/26* | (2006.01) |
| *H04L 5/00* | (2006.01) |

(52) U.S. Cl.
CPC .......... *H04L 27/148* (2013.01); *H04L 5/0007* (2013.01); *H04L 25/0328* (2013.01); *H04L 27/265* (2013.01); *H04L 27/2614* (2013.01)

(58) Field of Classification Search
CPC ............... H04L 27/2662; H04L 27/148; H04L 25/0328; H04L 27/2614; H04L 27/265; H04L 5/0007; H04L 27/2607; H04L 27/2656; H04L 27/26; H04L 27/2675; H04L 25/03006; H04L 25/03019; H04L 5/0051; H04L 25/0202; H04L 25/03012; H04L 27/2691
See application file for complete search history.

(56) References Cited

U.S. PATENT DOCUMENTS

| | | | | |
|---|---|---|---|---|
| 10,327,213 | B1 * | 6/2019 | Han ..................... | H04W 52/367 |
| 2005/0180533 | A1 * | 8/2005 | Hamman ............. | H04L 27/2662 |
| | | | | 375/348 |
| 2010/0002817 | A1 * | 1/2010 | Vrcelj ................. | H04L 27/2662 |
| | | | | 375/354 |
| 2011/0150059 | A1 * | 6/2011 | Cedergren ............ | H04L 25/067 |
| | | | | 375/224 |
| 2011/0158342 | A1 * | 6/2011 | Srinivasan .......... | H04L 27/2662 |
| | | | | 375/285 |
| 2013/0303167 | A1 * | 11/2013 | Zhu ...................... | H04B 7/0417 |
| | | | | 455/436 |

* cited by examiner

*Primary Examiner* — Khanh C Tran
(74) *Attorney, Agent, or Firm* — Locke Lord LLP; Tim Tingkang Xia, Esq.

(57) ABSTRACT

A symbol boundary detection method includes: calculating desired signal power according to a receiving signal by a receiver device; calculating interference power according to the receiving signal by the receiver device; calculating a signal-to-interference power ratio according to the desired signal power and the interference power by the receiver device; finding a best signal-to-interference power ratio to determine a reference symbol boundary time by the receiver device; and processing the receiving signal according to the reference symbol boundary time by the receiver device for a subsequent demodulation process performed by a demodulator circuit.

16 Claims, 4 Drawing Sheets

SYMBOL BOUNDARY DETECTION METHOD AND PROCESSOR

RELATED APPLICATIONS

This application claims priority to Taiwanese Application Serial Number 109114418, filed Apr. 29, 2020, which is herein incorporated by reference.

BACKGROUND

Technical Field

The present disclosure relates to an optimized symbol boundary detection technology that can improve the final demodulation performance. More particular, it relates to a symbol boundary detection method and a processor which can extract desired signals and interference in advance and obtain the result of evaluating the output of the symbol boundary detection.

Description of Related Art

With developments of technology, various electrical devices are applied in many technology fields. Two electrical devices can transmit data to each other through communication technologies.

In some related approaches, a symbol boundary detection process is performed on a packet or a receiving signal in advance for subsequent demodulation process. However, inappropriate symbol boundary detection process leads interference to the demodulator easily. This will reduce the signal-to-interference ratio of the communication system. In this case, it will affect the subsequent demodulation process and affect the throughput of the communication system.

SUMMARY

Some aspects of the present disclosure are to provide a symbol boundary detection method. The symbol boundary detection method includes the following steps: calculating desired signal power according to a receiving signal by a receiver device; calculating interference power according to the receiving signal by the receiver device; calculating a signal-to-interference power ratio according to the desired signal power and the interference power by the receiver device; finding a best signal-to-interference power ratio to determine a reference symbol boundary time by the receiver device; and processing the receiving signal according to the reference symbol boundary time by the receiver device for a subsequent demodulation process performed by a demodulator circuit.

Some aspects of the present disclosure are to provide a processor. The processor calculates desired signal power according to a receiving signal, calculates interference power according to the receiving signal, calculates a signal-to-interference power ratio according to the desired signal power and the interference power, finds a best signal-to-interference power ratio to determine a reference symbol boundary time, and processes the receiving signal according to the reference symbol boundary time for a subsequent demodulation process performed by a demodulator circuit.

As described above, the symbol boundary detection method and the processor of the present disclosure utilize the better symbol boundary detection method to generate the better symbol boundary detection result. Therefore, it facilities subsequent demodulation process.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in part of embodiments of the present embodiments. Furthermore, for simplifying the drawings, some of the conventional structures and elements are shown with schematic illustrations.

It will be understood that, although the terms first, second, third etc. may be used in the present disclosure to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

In the present disclosure, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in the present disclosure, specify the presence of stated features, regions, integers, steps, operations, elements, and/or components, but do not preclude the presence or addition of one or more other features, regions, integers, steps, operations, elements, components, and/or groups thereof.

In the present disclosure, "connected" or "coupled" may refer to "electrically connected" or "electrically coupled." "Connected" or "coupled" may also refer to operations or actions between two or more elements.

Figure 1:
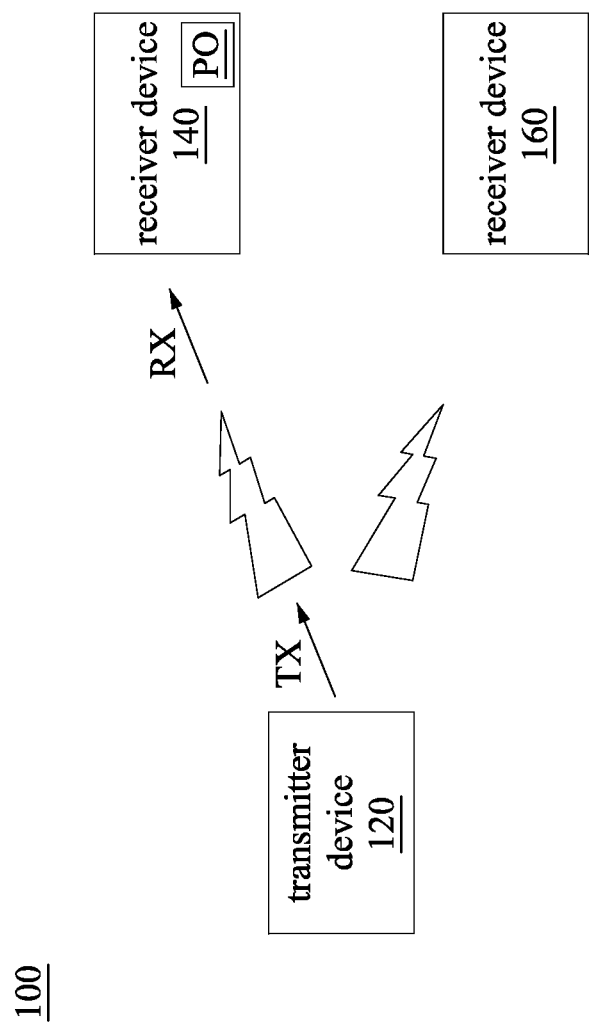
FIG. 1 is a schematic diagram of a communication system according to some embodiments of the present disclosure.

Reference is made to FIG. 1. FIG. 1 is a schematic diagram of a communication system 100 according to some embodiments of the present disclosure. As illustrated in FIG. 1, the communication system 100 includes a transmitter device 120, a receiver device 140, and a receiver device 160.

In some embodiments, the transmitter device 120 can transmit data to the receiver device 140 and the receiver device 160 through communication technologies. In some embodiments, the communication system 100 is applied to Wireless Local Area Network (WLAN). In addition, in some embodiments, Orthogonal Frequency-Division Multiplexing (OFDM) technology or Orthogonal Frequency-Division Multiplexing address (OFDMA) technology is utilized in the communication system 100 to transmit or receive data, but the present disclosure is not limited thereto.

The quantity of the transmitter device or the quantity of the receiver devices is for illustration, and various quantities of the transmitter device or various quantities of the receiver devices are within the contemplated scope of the present disclosure.

In some embodiments, the receiver device 140 and the receiver device 160 can perform the same or similar operations. For ease of understanding, only the receiver device 140 is taken as an example in the following paragraphs.

In operation, the transmitter device 120 transmits a transmission signal TX (for example, packet(s)) to the receiver device 140 through signal channels of the aforementioned communication technologies. The receiver device 140 receives a receiving signal RX through signal channels of the aforementioned communication technologies. In some embodiments, if there is interruption during the transmission procedure, the receiving signal RX received by the receiver device 140 is not the same to the transmission signal TX.

In the embodiments of utilizing OFDM technology, the transmission signal TX and the receiving signal RX are OFDM signals. In the embodiments of utilizing OFDMA technology, the transmission signal TX and the receiving signal RX are OFDMS signals.

Figure 2:
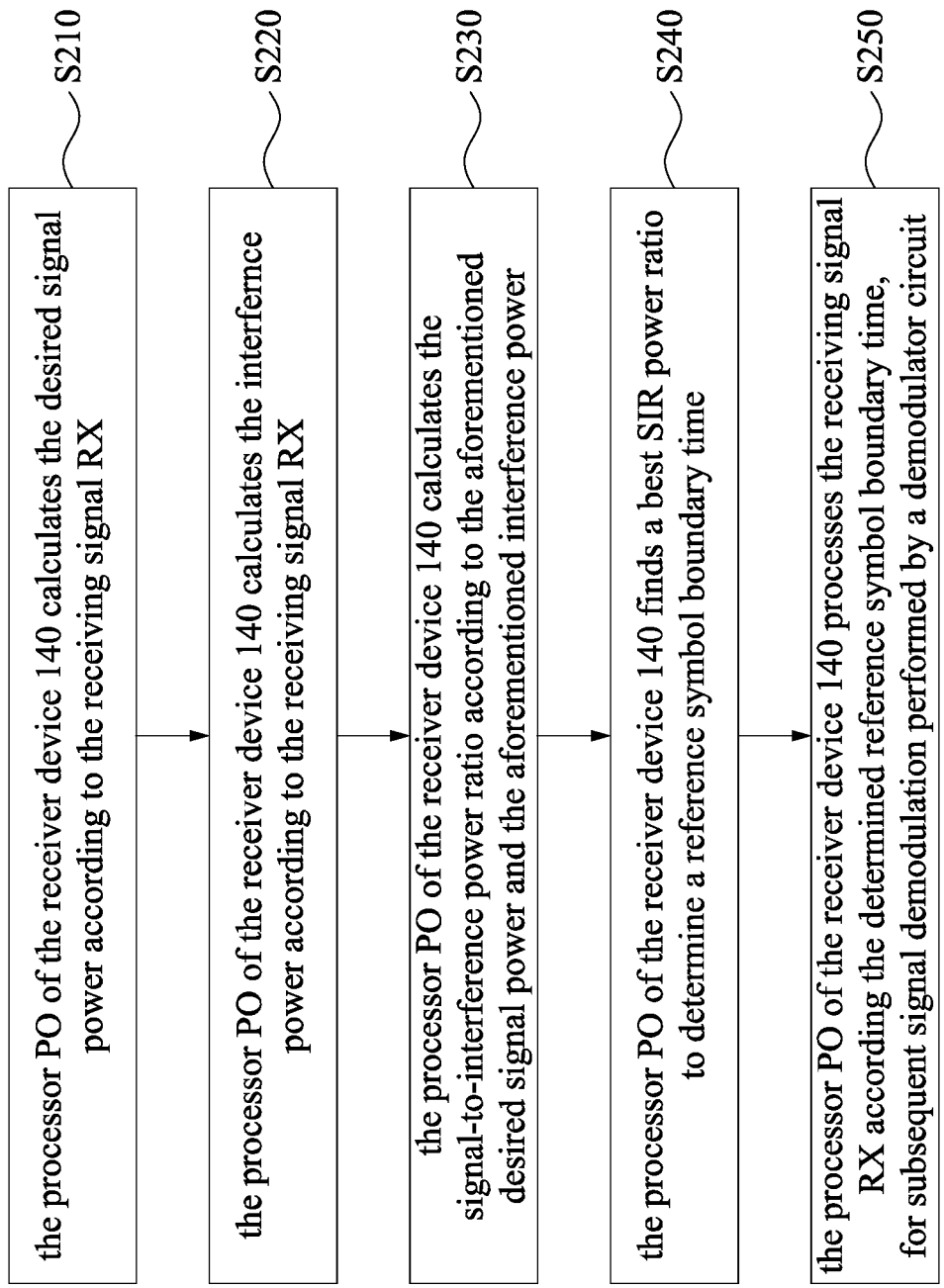
FIG. 2 is a flow diagram of a symbol boundary detection method according to some embodiments of the present disclosure.

Reference is made to FIG. 2. FIG. 2 is a flow diagram of a symbol boundary detection method 200 according to some embodiments of the present disclosure. In some embodiments, the receiver device 140 in FIG. 1 includes a processor PO. The processor PO can perform the symbol boundary detection method 200 in FIG. 2. As illustrated in FIG. 2, the symbol boundary detection method 200 includes operations S210, S220, S230, S240, and S250.

Figure 3:
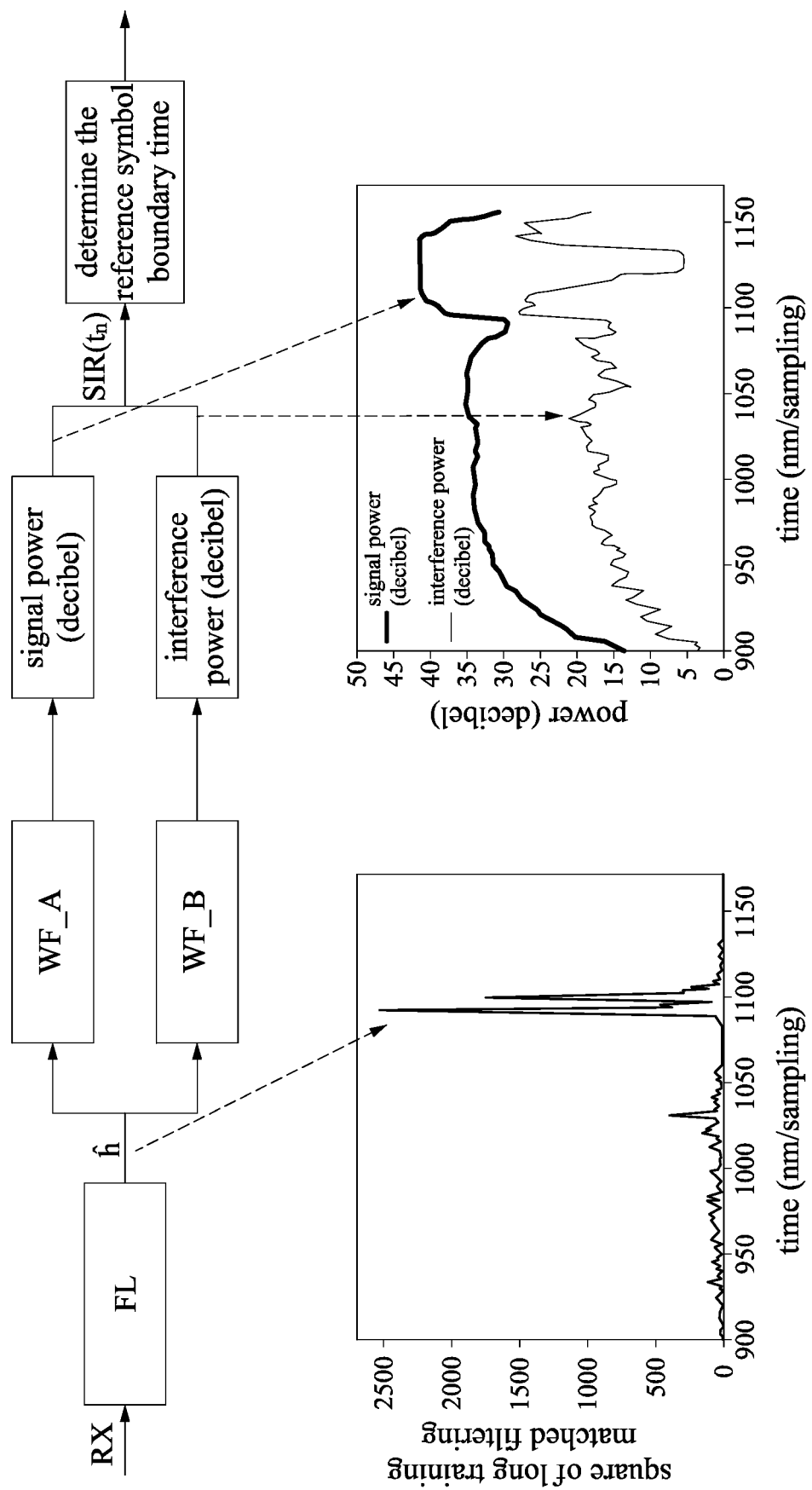
FIG. 3 is a schematic diagram of signal processing stages according to some embodiments of the present disclosure.

The following paragraphs are described with reference to FIG. 3. FIG. 3 is a schematic diagram of signal processing stages according to some embodiments of the present disclosure.

In operation S210, the processor PO of the receiver device 140 calculates desired signal power according to the receiving signal RX. As illustrated in FIG. 1 and FIG. 3, the processor PO performs a long training matched filtering process FL on the receiving signal RX to generate an output signal ĥ. In some embodiments, the long training matched filtering process FL can reflect a channel impulse response (CIR) of a signal channel.

For example, the processor PO compares the receiving signal RX with signal patterns defined in a communication standard, to perform the cross-correlation process, so as to generate the output signal ĥ. In some embodiments, the processor PO applies a first window function WF_A on the output signal ĥ, to generate a final desired signal and to calculate desired signal power at each sampling time. According to the observation time, there are a late type, an early type, and a protection-block type.

Figure 4:
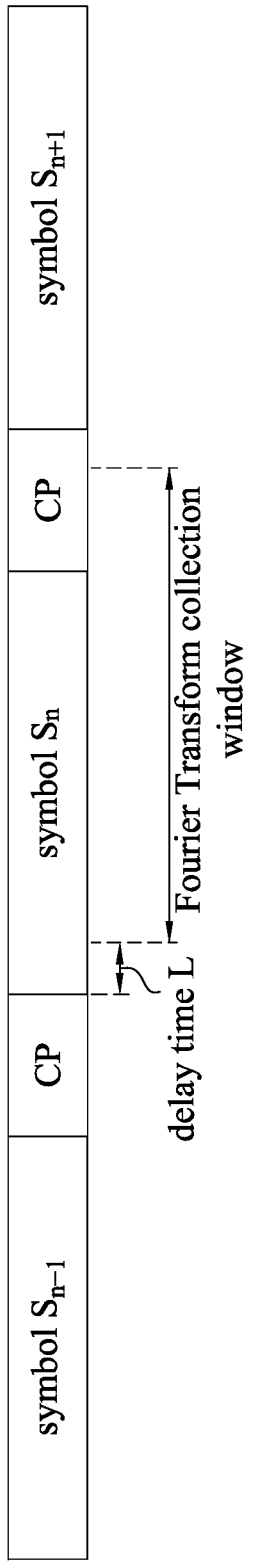
FIG. 4 is a schematic diagram of a late type according to some embodiments of the present disclosure.

Reference is made to FIG. 4. FIG. 4 is a schematic diagram of the late type according to some embodiments of the present disclosure. As illustrated in FIG. 4, there is a cyclic prefix CP between a bit $S_{n-1}$ and a bit $S_n$, and there is a cyclic prefix CP between the bit $S_n$ and a bit $S_{n+1}$. In the late type, a time delay L between a start point of a Fourier Transform collection window FW and a start point of the symbol $S_n$ satisfies the formula (1) below:

$$0<L<N \qquad \text{formula (1)}$$

N is a sampling number of the symbol $S_n$. The desired signal power in the late type satisfies the formula (2) below:

$$\sigma_d^2(t_n) = \mathbb{E}\{|h[t_n+L]|^2\} \cdot \left(1 - \frac{L}{N}\right)^2 \qquad \text{formula (2)}$$

$t_n$ is an observation time, h $[t_n+L]$ reflects the channel impulse response corresponding to the start point of a Fourier Transform collection window FW.

Figure 5:
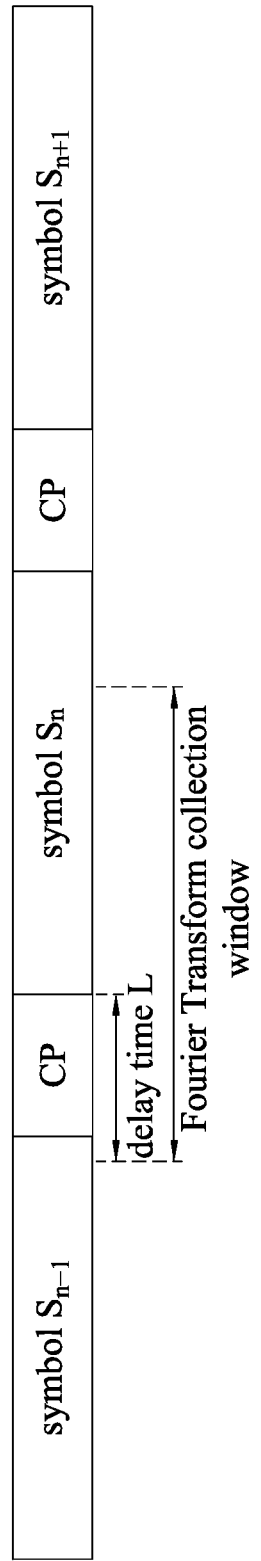
FIG. 5 is a schematic diagram of an early type according to some embodiments of the present disclosure.

FIG. 5 is a schematic diagram of the early type according to some embodiments of the present disclosure. As illustrated in FIG. 5, in the early type, a time delay L between a start point of a Fourier Transform collection window FW and a start point of the symbol $S_n$ satisfies the formula (3) below:

$$-N_{CP}-N \leq L \leq -N_{CP} \qquad \text{formula (3)}$$

$N_{CP}$ is a sampling number of the cyclic prefix CP. The desired signal power in the early type satisfies the formula (4) below:

$$\sigma_d^2(t_n) = \mathbb{E}\{|h[t_n+L]|^2\} \cdot \left(1 - \frac{N_{cp}-L}{N}\right)^2 \qquad \text{formula (4)}$$

Figure 6:
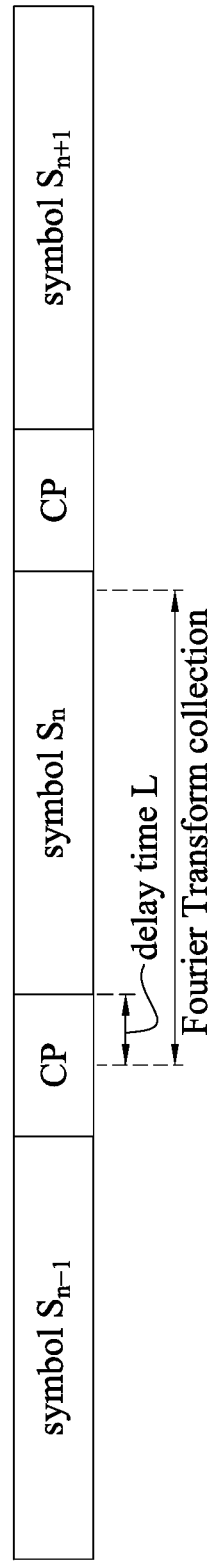
FIG. 6 is a schematic diagram of a protection-block type according to some embodiments of the present disclosure.

FIG. 6 is a schematic diagram of the protection-block type according to some embodiments of the present disclosure. As illustrated in FIG. 6, in the protection-block type, a time delay L between a start point of a Fourier Transform collection window FW and a start point of the symbol $S_n$ satisfies the formula (5) below:

$$-N_{CP} \leq L \leq 0 \qquad \text{formula (5)}$$

In other words, the start point of a Fourier Transform collection window FW is in the block of the cyclic prefix CR The desired signal power in the protection-block type satisfies the formula (6) below:

$$\sigma_d^2(k) = \mathbb{E}\{|h[t_n+L]|^2\} \qquad \text{formula (6)}$$

Reference is made to FIG. 2. In operation S220, the processor PO of the receiver device 140 calculates the interference power according to the receiving signal RX. In some embodiments, the interference includes inter-symbol interference (ISI) and inter-carrier interference (ICI). The interference would cause signal distortion. In some embodiments, the processor PO applies a second window function WF_B on the output signal ĥ to generate a final interference signal and to calculate interference power at each sampling time, as illustrated in FIG. 3.

The interference power (ISI and ICI) in the delay type satisfies the formula (7) below:

$$\sigma_{Inf}^2(t_n) = \sum_{1} \left( \mathbb{E}\{|h[t_n+L]|^2\} \cdot \left(\frac{L}{N} - \left(\frac{L}{N}\right)^2 + \frac{L}{N}\right) \right) \qquad \text{formula (7)}$$

The interference power (ISI and ICI) in the early type satisfies the formula (8) below:

$$\sigma_{Inf}^2(t_n) = \qquad \text{formula (8)}$$

$$\sum_1 \left( \mathbb{E}\{|h[t_n + L]|^2\} \cdot \left( \frac{N_{cp} - L}{N} - \left(\frac{N_{cp} - L}{N}\right)^2 + \frac{N_{cp} - L}{N} \right) \right)$$

In addition, there is no interference in the protection-block type. In other words, the interference power in the protection-block type is zero.

Reference is made to FIG. 3 again. In operation S230, the processor PO of the receiver device 140 calculates the signal-to-interference power ratio (SIR power ratio) according to the aforementioned desired signal power and the aforementioned interference power. In some embodiments, the processor PO transfers the desired signal power into a decibel domain, to generate the desired signal power decibel value. Similarly, the processor PO transfers the interference power into the decibel domain, to generate the interference power decibel value.

Then, the processor PO subtracts the interference power decibel value from the desired signal power decibel value (equal to a ratio of the desired signal power and the interference power), to calculate SIR power ratio $SIR(t_n)$ of each sampling time, as the formula (9) below:

$$SIR(t_n) = 10 \cdot \log(\sigma_d^2(t_n)) - 10 \cdot \log(\sigma_{intf}^2(t_n)) \qquad \text{formula (9)}$$

$t_n$ is a sampling time, n is an index, $SIR(t_n)$ is the SIR power ratio at the sampling time $t_n$, $10 \cdot \log(\sigma_d^2(t_n))$ is the desired signal power decibel value, and $10 \cdot \log(\sigma_{intf}^2(t_n))$ is the interference power decibel value.

In the operation S240, the processor PO of the receiver device 140 finds a best SIR power ratio to determine a reference symbol boundary time. In other words, the processor PO determines the reference symbol boundary time (corresponding to the symbol boundary) according to these SIR power ratios at each sampling time. The SIR power ratio can be configured to evaluating the symbol boundary.

In some embodiments, the processor PO finds a maximum SIR power ratio from multiple values of the SIR power ratios corresponding to these sampling time, and determines the sampling time corresponding to the maximum SIR power ratio to be the reference symbol boundary time, as the formula (10) below:

$$t_{opt} = \arg \max_{t_n} SIR(t_n) \qquad \text{formula (10)}$$

$t_{opt}$ is the sampling time corresponding to the maximum SIR power ratio. The processor PO determines the sampling time $t_{opt}$ to be the reference symbol boundary time.

In some other embodiments, the processor PO is configured to find a best SIR power ratio from multiple values of the SIR power ratios corresponding to these sampling time to be a reference symbol boundary time. For example, when a difference between the SIR power ratio at one sampling time and the SIR power ratio at the next sampling time is less than a threshold value and lasts for a period of sampling time, it means that the SIR power ratio of the signal is in the plain area during the period of sampling time (meaning in a protection interval which is no ISI (ISI free) and no ICI (ICI free)). After passing through the plain area, it continues to detect whether a difference between the SIR power ratio at one sampling time and the SIR power ratio at the next sampling time is greater than a threshold value. When this event happens, it means that the SIR power ratio is rapidly decreasing. It means that this period of time is the falling edge of the SIR power ratio. Accordingly, the processor PO determines the one sampling time to be the reference symbol boundary time.

In operation S250, the processor PO of the receiver device 140 processes the receiving signal RX according the determined reference symbol boundary time, for subsequent signal demodulation performed by a demodulator circuit. For example, the processor PO performs Fourier Transform process on the receiving signal RX according to the determined reference symbol boundary time, to transfer the signal from a time domain into a frequency domain. In some embodiments, the aforementioned Fourier Transform process may be Fast Fourier Transform (FFT) process. Then, the demodulator circuit performs the demodulation process according to the signal in the frequency domain, to demodulate the receiving signal RX.

In some related approaches, the peak finding algorithm or other traditional algorithms are used to perform symbol boundary detection process. In other words, these related approaches use the peak finding algorithm or other algorithms to find the reference symbol boundary time corresponding to symbol boundary, and perform signal conversion (for example: fast Fourier Transform) according to the reference symbol boundary time for subsequent signal demodulation. However, taking the peak finding algorithm as an example, it only considers the signal peaks, without considering the impact of interference. For example, the peak finding algorithm may capture false peaks caused by interference signals or other undesired signals. Based on this, the reference symbol boundary time determined according to the peak finding algorithm may cause that the demodulator circuit cannot demodulate the correct signal.

Compared with the above related approaches, in the present disclosure, the receiver device 140 calculates the appropriate reference symbol boundary time according to the SIR power ratio. Since the present disclosure considers the desired signal power and the interference power (SIR power ratio), the symbol boundary detection process of the present disclosure generates better symbol boundary detection results, to determine the appropriate reference symbol boundary time more accurately. Therefore, it is beneficial to the subsequent demodulation, and the performance and the throughput of the communication system are improved.

In addition, the desired signal power and the interference power of the present disclosure are calculated according to the same signal (the output signal ĥ). Accordingly, compared to the peak finding algorithm or other traditional algorithm, the symbol boundary detection process of the present disclosure is less sensitive to changes of strength, interference intensity, and noise components in a signal. Therefore, the symbol boundary detection process of the present disclosure is more adaptable to different noise environments and has more stable detection efficiency.

Furthermore, in some embodiments of determining the reference symbol boundary time based on the maximum SIR power ratio, best reference symbol boundary time is obtained.

The above description of the symbol boundary detection method 200 includes exemplary operations, but the operations of the symbol boundary detection method 200 are not necessarily performed in the order described. The order of the symbol boundary detection method 200 disclosed in the present disclosure are able to be changed, or the operations are able to be executed simultaneously or partially simultaneously as appropriate, in accordance with the spirit and scope of various embodiments of the present disclosure.

As described above, the symbol boundary detection method and the processor of the present disclosure utilize the better symbol boundary detection method to generate the better symbol boundary detection result. Therefore, it facilities subsequent demodulation process.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A symbol boundary detection method, comprising:
    calculating desired signal power according to a receiving signal by a receiver device;
    calculating interference power according to the receiving signal by the receiver device;
    calculating a signal-to-interference power ratio according to the desired signal power and the interference power by the receiver device;
    finding a best signal-to-interference power ratio to determine a reference symbol boundary time by the receiver device, comprising:
        determining a sampling time corresponding to a falling edge according to a plurality of values of the signal-to-interference power ratio by the receiver device, wherein a difference between the signal-to-interference power ratio at the sampling time and the signal-to-interference power ratio at a next sampling time is greater than a threshold value; and
        determining the sampling time to be the reference symbol boundary time by the receiver device; and
    processing the receiving signal according to the reference symbol boundary time by the receiver device for a subsequent demodulation process performed by a demodulator circuit.

2. The symbol boundary detection method of claim 1, wherein calculating the signal-to-interference power ratio according to the desired signal power and the interference power by the receiver device comprises:
    transferring the desired signal power into a decibel domain by the receiver device, to generate a desired signal power decibel value;
    transferring the interference power into the decibel domain by the receiver device, to generate an interference power decibel value; and
    subtracting the interference power decibel value from the desired signal power decibel value, to generate the signal-to-interference power ratio.

3. The symbol boundary detection method of claim 1, wherein calculating the desired signal power according to the receiving signal by the receiver device comprises:
    performing a long training matched filtering process on the receiving signal by the receiver device to generate an output signal; and
    applying a first window function on the output signal by the receiver device, to calculate the desired signal power.

4. The symbol boundary detection method of claim 3, wherein calculating the interference power according to the receiving signal by the receiver device comprises:
    applying a second window function on the output signal by the receiver device, to calculate the interference power.

5. The symbol boundary detection method of claim 1, wherein processing the receiving signal according to the reference symbol boundary time by the receiver device for the subsequent demodulation process performed by the demodulator circuit comprises:
    performing a Fourier Transform process on the receiving signal according to the reference symbol boundary time by the receiver device, to acquire a frequency-domain signal; and
    performing the subsequent demodulation process according to the frequency-domain signal by the demodulator circuit, to acquire a demodulation signal.

6. The symbol boundary detection method of claim 1, wherein the interference power comprises inter-symbol interference (ISI) power and inter-carrier interference (ICI) power.

7. The symbol boundary detection method of claim 1, wherein the receiving signal is an OFDM signal or an OFMDA signal.

8. The symbol boundary detection method of claim 1, wherein a cyclic prefix is arranged between two symbols of the receiving signal.

9. A processor configured to calculate desired signal power according to a receiving signal, calculate interference power according to the receiving signal, calculate a signal-to-interference power ratio according to the desired signal power and the interference power, determine a sampling time corresponding to a falling edge according to a plurality of values of the signal-to-interference power ratio, determine the sampling time to be a reference symbol boundary time, and process the receiving signal according to the reference symbol boundary time for a subsequent demodulation process performed by a demodulator circuit,
    wherein a difference between the signal-to-interference power ratio at the sampling time and the signal-to-interference power ratio at a next sampling time is greater than a threshold value.

10. The processor of claim 9, wherein the processor is further configured to transfer the desired signal power into a decibel domain to generate a desired signal power decibel value, transfer the interference power into the decibel domain to generate an interference power decibel value, and subtract the interference power decibel value from the desired signal power decibel value to generate the signal-to-interference power ratio.

11. The processor of claim 9, wherein the processor is further configured to apply a first window function on an output signal to calculate the desired signal power, wherein the output signal is generated by performing a long training matched filtering process on the receiving signal.

12. The processor of claim 11, wherein the processor is further configured to apply a second window function on the output signal to calculate the interference power.

13. The processor of claim 9, wherein the processor is further configured to perform a Fourier Transform process on the receiving signal according to the reference symbol boundary time to acquire a frequency-domain signal, and perform the subsequent demodulation process according to the frequency-domain signal to acquire a demodulation signal.

14. The processor of claim 9, wherein the interference power comprises ISI power and ICI power.

15. The processor of claim 9, wherein the receiving signal is an OFDM signal or an OFMDA signal.

16. The processor of claim 9, wherein a cyclic prefix is arranged between two symbols of the receiving signal.

* * * * *